Oct. 30, 1962    R. M. FIANDT ETAL    3,061,827
APPARATUS FOR INDICATING CHRONIC STORAGE BATTERY UNDERCHARGE
Filed Sept. 8, 1959    2 Sheets-Sheet 1
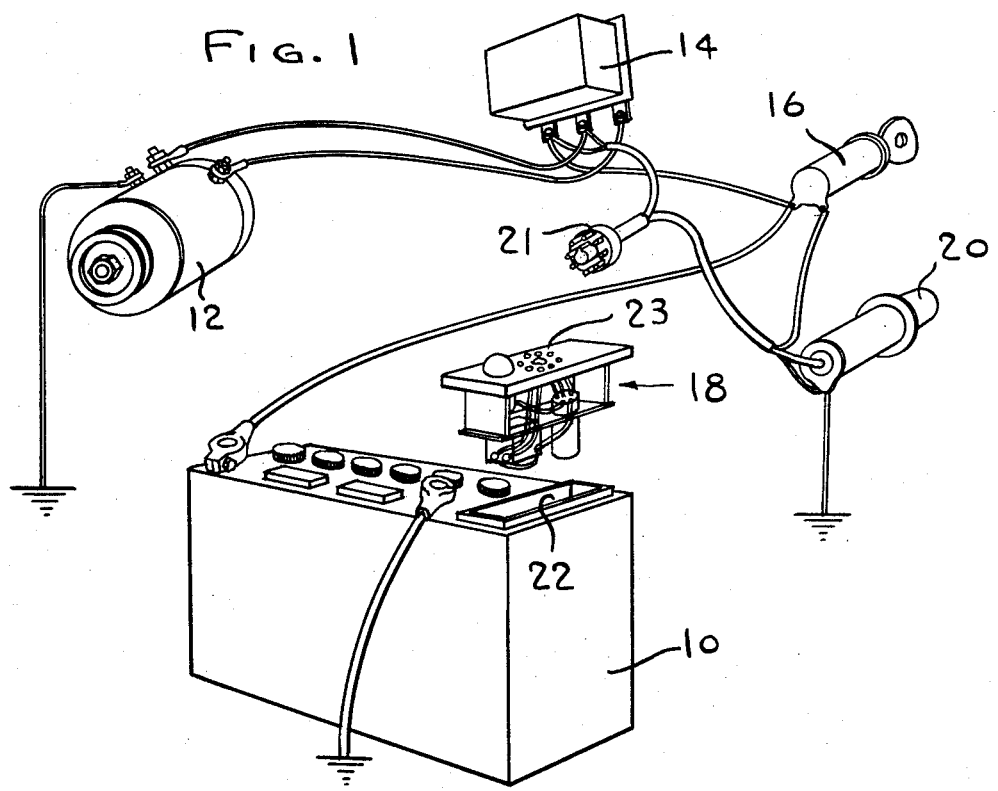
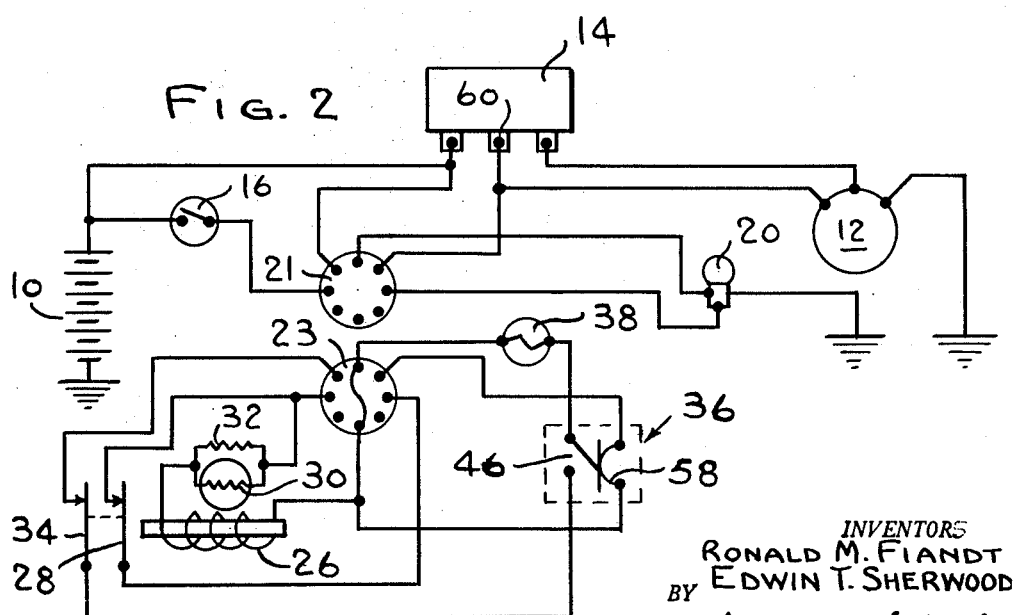
INVENTORS
RONALD M. FIANDT
BY EDWIN T. SHERWOOD
John W. Michael
ATTORNEY Oct. 30, 1962  R. M. FIANDT ETAL  3,061,827
APPARATUS FOR INDICATING CHRONIC STORAGE BATTERY UNDERCHARGE
Filed Sept. 8, 1959  2 Sheets-Sheet 2

INVENTORS
RONALD M. FIANDT
BY EDWIN T. SHERWOOD

John W. Michael
ATTORNEY

United States Patent Office 3,061,827
Patented Oct. 30, 1962

3,061,827
APPARATUS FOR INDICATING CHRONIC
STORAGE BATTERY UNDERCHARGE
Ronald M. Fiandt, Menomonee Falls, and Edwin T. Sherwood, Bayside, Wis., assignors to Globe-Union Inc., Milwaukee, Wis., a corporation of Delaware
Filed Sept. 8, 1959, Ser. No. 838,545
7 Claims. (Cl. 340—249)

This invention relates to apparatus for indicating chronic storage battery undercharge and although not limited thereto is particularly adapted for indicating such a condition to the operator of an automobile.

Chronic low voltage or undercharge, if not remedied, leads to a considerably shortened battery life. Such undercharge may be due to normal deterioration of the plates or may indicate a partial grounding in the electrical system, a voltage regulator that is not properly adjusted or functioning properly or a generator that needs attention due to low output. In any event it is highly desirable that the driver be able to detect this condition before complete failure occurs so that the necessary steps can be taken to remedy the situation.

The voltage across the terminals of a storage battery is subject to a number of variables which must be taken into account to accurately determine the true electrochemical condition of the battery. The difference between a full charge and a half charge is only about ½-volt for a 12-volt battery. Thus, it is seen that the failure to compensate for even a very small deviation from the voltage representing the true electro-chemical condition of the battery may result in an inaccurate indication. For example, a 12-volt battery having a given electro-chemical condition may read anywhere from 10 to 15 volts across its terminals, depending upon the electrical load in terms of accessories, driving speed, etc. Even when the motor and all accessories are turned off the so-called "surface charge" on the battery plates may give readings up to ½-volt in excess of the voltage indicating the true condition of the battery.

It is the object of this invention, therefore, to provide a relatively simple and inexpensive means for accurately determining the true electro-chemical condition of a storage battery which does not itself require large amounts of current for its operation.

This object is attained in a storage battery installed in the ignition system of an automobile by apparatus including a normally closed voltage sensitive relay connected across the terminals of the battery in series with the ignition switch for the system. The relay is equipped with a first set of relay contacts connected in series with the ignition switch and an indicator light but in parallel with the relay coil so that when the ignition switch is closed the indicator light will light and remain lit if the voltage at the battery terminals is below a predetermined value.

To compensate for inaccuracies due to temperature variations of the voltage sensitive relay, a semi-conductor having a negative temperature coefficient of resistance and an ordinary resistor are connected in parallel with each other and in series with the relay. Furthermore, to dissipate surface charge on the battery plates which would otherwise cause inaccurate indications we provide a means including a second set of relay contacts and a thermal switch for dissipating such surface charge each time the ignition switch is opened. The thermal switch includes a pair of thermal switch contacts and a thermal element. The second relay contacts and thermal switch contacts are connected across the battery terminals in series with a resistor so that when the ignition switch is opened the surface charge on the plates will be drawn off by the resistor. This circuit will remain established until the thermal element cools. The thermal element is energized from the engine generator so that when the engine is stopped the thermal element will begin cooling and thereby open the thermal switch contacts to stop discharging the battery after a short period of time has elapsed.

Other objects and advantages will be pointed out in, or be apparent from the specification and claims, as will obvious modifications of the two embodiments shown in the drawings, in which:

FIG. 1 is a partially schematic view of an automobile electrical system embodying the invention;

FIG. 2 is a partially schematic wiring diagram of the system shown in FIG. 1;

Figure 5:
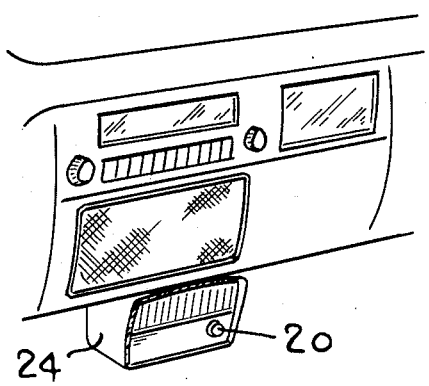
FIG. 5 is a fragmentary perspective view of an automobile dashboard showing an alternative arrangement for mounting the components of the system in an automobile.

Referring now to the drawings in detail, FIG. 1 shows one embodiment of our invention including a 12-volt battery 10, generator 12, voltage regulator 14, and ignition switch 16 connected in circuit with an assembly 18 of indicator components and dashboard mounted indicator light 20 by means of suitable electric cables and male and female plug-type connectors 21 and 23, respectively, as shown. In the FIG. 1 arrangement, the assembly 18 of components is mounted in a compartment 22 formed in the casing of the battery. An alternative arrangement is shown in FIG. 5 wherein the indicator components and the indicator light 20 are housed in a casing 24 mounted on the automobile dashboard.

Figure 4:
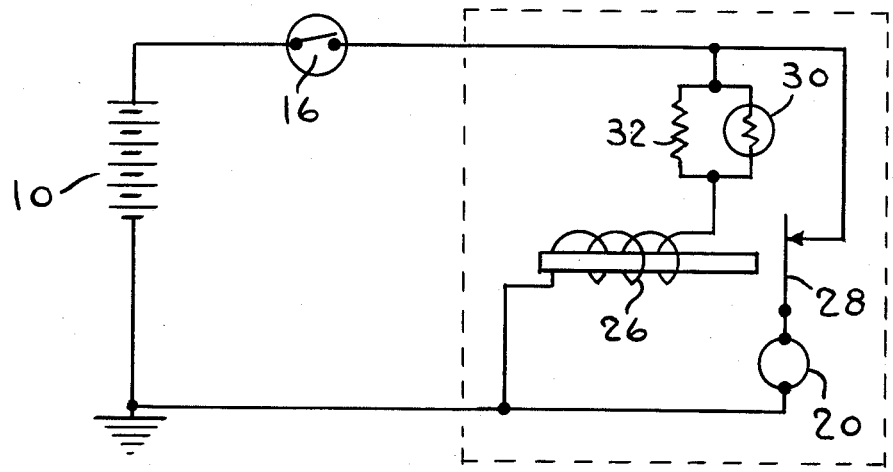
FIG. 4 is a wiring diagram of a simplified system embodying the invention.

Our invention in its broadest aspects is shown in FIG. 4 wherein a voltage sensitive relay 26 having normally closed switch contacts 28 is connected across the terminals of battery 10. Contacts 28 and indicator light 20 are connected in series across the battery terminals and parallel with relay 26. Thus, when ignition switch 16 is closed to start the automobile relay 26 will be energized by battery 10 and if the voltage across the relay is sufficient, switch 28 will open and light 20 will not light. However, if the voltage is below a predetermined amount switch 28 will not open and light 20 will be illuminated. Thus, it is seen that if the battery voltage at the time ignition switch 16 is closed represents the true electrochemical condition of the battery the indication given by light 20 will inform the driver as to the condition of the battery. Assuming that all accessories such as radio, etc. are turned off it will be appreciated that by relating the indicating means to the ignition switch in the manner shown, all inaccuracies arising from variables resulting from running the engine, etc. are eliminated.

There are, however, other variables which must be compensated for to provide accurate indication. For example, due to the change in resistance of the copper coil in voltage sensitive relay 26 with changes in temperature some means must be provided to compensate for this variable in order to maintain the required accuracy. To this end we provide a temperature compensating means including a semi-conductor (thermistor) 30 having a negative temperature coefficient of resistance connected in series with relay 26. With an increase in temperature, for example, the resistance of relay coil 26 will also increase but the resistance of semi-conductor 30 due to its negative temperature coefficient of resistance will decrease. Thus, it is seen that by selecting a semi-conductor of the proper characteristics the effect of temperature on the operating voltage of the voltage sensitive relay can be substantially eliminated. The use of a thermistor 30 above, however, does not fully compensate for all temperature variations due to the difference between the characteristics of the temperature-resistance relationship of a metal conductor (straight-line function) and that of a semi-conductor (a curve). We have found that by the use of a resistor 32 of the proper value connected in parallel with thermistor 30 as shown, that almost exact temperature compensation is produced over a range from 0° F. to 150° F.

Another phenomenon which must be taken into account in determining the true electro-chemical condition of a storage battery is the so-called "surface charge" on the plates which may temporarily cause initial open circuit voltage readings up to ½-volt in excess of the true open circuit voltage of the battery. This "surface charge" on the plates will, however, gradually dissipate over an eight hour period of battery nonuse so that if the battery is checked only at such intervals there is no need for a means for compensating for such "surface charge." The indicating arrangement shown in FIG. 4 has no means for compensating for "surface charge" and is therefore accurate only when checking the battery at intervals of eight hours or more.

Figure 3:
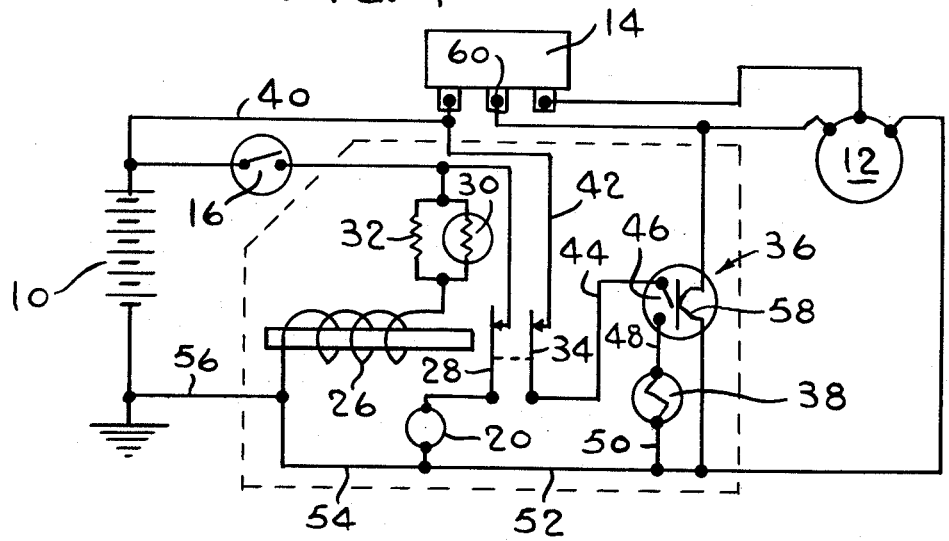
FIG. 3 is a simplified wiring diagram of the system shown in FIGS. 1 and 2.

To compensate for "surface charge" and thereby provide accurate readings at intervals less than eight hours, additional components must be incorporated into the basic arrangement shown in FIG. 4. The result is the more complex arrangement shown in FIGS. 1, 2 and 3 which are actually three illustrations of the same arrangement. For purposes of clarity, reference will be made exclusively to FIG. 3 in the following description. In addition to the voltage sensitive relay 26 and temperature compensating means (thermistor 30 and resistor 32) previously described, we compensate for "surface charge" by the provision of an additional set of switch contacts 34 for the voltage sensitive relay, a thermal switch 36 and a resistor 38 connected in circuit as shown in FIG. 3.

Thus, with the engine running (ignition switch 16 closed), generator 12 will energize the thermal element 58 of thermal switch and thereby close the normally open switch contacts 46 of the thermal switch. Also while the engine is running, relay 26 will be energized causing normally closed relay switch contacts 28 and 34 to assume an open position. Now when the ignition switch 16 is opened to stop the engine, relay contacts 28 and 34 will close and the "surface charge" on the battery plates will then be readily dissipated through the circuit comprising conductors 40, 42, normally closed relay contacts 34, conductor 44, thermal switch contacts 46, conductor 48, resistor 38 and conductors 50, 52, 54, 56 to ground. Thermal element 58, it is noted, is deenergized when the engine stops with the result that the above described "surface charge" dissipating circuit is established only until thermal element 58 cools at which time contacts 46 open to open the circuit. Resistor 38 (preferably about 75 watts) will draw between 20 and 25 ampere minutes of power from the battery while element 58 is cooling which is roughly equivalent to the drain produced by turning on the headlights for approximately two minutes.

Thermal element 58, it is noted, is connected to the current relay terminal 60 of regulator 14 instead of to ignition switch 16. This arrangement prevents even the small drain (about ½ ampere) on the battery due to element 58 when idling or when accessory loads exceed the output of generator 12. However, on 1957 and newer cars (having greater generator capacity and continuous generation at idle speeds) this connection can be made directly to the ignition switch.

Now with the "surface charge" dissipated as described above, voltage sensitive relay will serve to indicate the true electro-chemical condition of battery 10 when ignition switch 16 is again closed. This, of course, can be done without first waiting for an interval of about 8–10 hours to permit gradual dissipation of the "surface charge" as is the case with the arrangement shown in FIG. 4.

Although two embodiments of the present invention have been illustrated and described, it will be apparent to those skilled in the art that various changes and modifications may be made therein without departing from the spirit of the invention or from the scope of the appended claims.

We claim:

1. Apparatus for indicating chronic undercharge of a storage battery in the ignition circuit of an internal combustion engine having a generator comprising, a voltage sensitive relay connected across the terminals of the battery, an ignition switch connected across the terminals of the battery in series with said relay, a first set of relay contacts operable by said relay, said contacts connected in series with said ignition switch and in parallel with said relay, an indicator light connected in series with said first set of relay contacts, temperature compensating means for compensating for variations in temperature of said relay including a semi-conductor having a negative temperature coefficient of resistance and a resistor, said semi-conductor and resistor connected in parallel with each other and in series with said relay, and surface charge dissipating means comprising a thermal switch including a pair of thermal switch contacts, a thermal element and a second set of relay contacts, said second set of relay contacts and said thermal switch contacts connected across the terminals of said battery in series with each other, said thermal element connected across the terminals of the generator.

2. Apparatus according to claim 1 in which said surface charge dissipating means further includes a second resistor connected in series with said second set of relay contacts and thermal switch contacts to drain off the surface charge on the plates of the storage battery when said ignition switch is opened.

3. Apparatus for indicating chronic undercharge of a storage battery connected in the ignition system of an automobile or the like comprising, a voltage sensitive relay permanently connected in the ignition system across the terminals of the battery, an ignition switch mounted on the dashboard of the automobile and connected in series with said relay, normally closed relay contacts operable by said relay, said contacts connected in series with said switch and in parallel with said relay, an indicator light mounted on the automobile dashboard and connected in series and said relay contacts, said voltage sensitive relay adapted to be enrgized when said ignition switch is closed if the terminal voltage of the battery is at or above a predetermined minimum voltage to thereby open said normally closed relay contacts and indicate to the driver the electro-chemical condition of the battery, and temperature compensating means connected in series with said relay and operable to compensate for variations in the temperature of said relay.

4. Apparatus for indicating the chronic undercharge of a storage battery comprising, a voltage sensitive relay connected across the terminals of the battery, a switch in series with said relay, relay contacts operable by said relay, said contacts connected in series with said switch and in parallel with said relay, an indicator light connected in series with said relay contacts, surface charge dissipating means for dissipating surface charge on the plates of the storage battery when said switch is opened so that when the switch is closed such surface charge will not cause said voltage sensitive relay to give an inaccurate indication, said surface charge dissipating means including a second set of relay contacts operable by said relay, and a thermal switch including a set of thermal switch contacts and a thermal element, said thermal switch contacts connected across the terminals of the battery and in series with said second set of relay contacts so that the surface charge on the battery plates will be dissipated through said thermal switch contacts when said switch is opened.

5. Apparatus according to claim 4 in which there is a resistor in series with said thermal switch contacts to draw off the surface charge on the battery plates.

6. Apparatus for indicating chronic undercharge of a storage battery comprising, a voltage sensitive relay connected across the terminals of the battery, a switch in series with said relay, relay contacts operable by said relay, said contacts connected in series with said switch and in parallel with said relay, an indicator light connected in series with said relay contacts, temperature compensating means connected in series with said relay for compensating for variations in temperature of said relay, surface charge dissipating means including a second set of relay contacts operable by said relay for dissipating the surface charge on the plates of the storage battery when said switch is opened so that when said switch is subsequently closed said voltage sensitive relay will provide an accurate reading, and a thermal switch including a set of thermal switch contacts and a thermal element, said thermal switch contacts connected across the terminals of the battery and in series with said second set of relay contacts so that the surface charge on the battery plates will be dissipated through said thermal switch contacts when said switch is opened.

7. Apparatus according to claim 6 in which said temperature compensating means includes a semi-conductor having a negative temperature coefficient of resistance and a resistor connected in parallel with each other.

References Cited in the file of this patent

UNITED STATES PATENTS

| | | |
|---|---|---|
| 1,922,792 | Cain | Aug. 15, 1933 |
| 2,632,793 | Linn | Mar. 24, 1953 |
| 2,709,216 | Moran et al. | May 24, 1955 |

FOREIGN PATENTS

| | | |
|---|---|---|
| 667,491 | Great Britain | Mar. 5, 1952 |